United States Patent [19]

Nakanishi et al.

[11] Patent Number: 5,378,527
[45] Date of Patent: Jan. 3, 1995

[54] CARBON FILM COATED GLASS

[75] Inventors: Masatsugu Nakanishi; Misao Tsutsuki; Shouji Yokoishi, all of Toyota, Japan

[73] Assignee: Toyota Jidosha Kabushiki Kaisha, Aichi, Japan

[21] Appl. No.: 836,022

[22] Filed: Feb. 14, 1992

[30] Foreign Application Priority Data

Feb. 15, 1991 [JP] Japan .................. 3-022387
Jul. 12, 1991 [JP] Japan .................. 3-172212

[51] Int. Cl.$^6$ .................................. C03C 17/34
[52] U.S. Cl. ............................ 428/216; 428/408; 428/426; 428/428; 428/697; 428/701; 428/702
[58] Field of Search ............ 428/408, 426, 428, 697, 428/216, 701, 702, 432

[56] References Cited

U.S. PATENT DOCUMENTS

| | | | |
|---|---|---|---|
| 4,072,782 | 2/1978 | Kramer et al. | 428/409 |
| 4,400,410 | 8/1983 | Green et al. | 427/38 |
| 4,485,146 | 11/1984 | Mizuhashi et al. | 428/428 |
| 4,504,519 | 3/1985 | Zebez | 428/408 |
| 4,597,844 | 7/1986 | Hiraki et al. | 428/408 |
| 4,636,435 | 1/1987 | Yanagihara et al. | 428/336 |
| 4,661,409 | 4/1987 | Kieser et al. | 428/426 |
| 4,777,090 | 10/1988 | Ovshinsky et al. | 428/408 |
| 4,783,361 | 11/1988 | Ovshinsky et al. | 428/217 |
| 4,907,846 | 3/1990 | Tustison et al. | 428/908.8 |

FOREIGN PATENT DOCUMENTS

| | | |
|---|---|---|
| 61-106494 | 5/1986 | Japan . |
| 62-196371 | 8/1987 | Japan . |
| 63-221840 | 9/1988 | Japan . |
| 63-221841 | 9/1988 | Japan . |
| 64-2001 | 1/1989 | Japan . |
| 2-188446 | 7/1990 | Japan . |
| 2-188447 | 7/1990 | Japan . |
| 2-188448 | 7/1990 | Japan . |
| 2192733A | 1/1988 | United Kingdom . |

OTHER PUBLICATIONS

Deutchman et al "Dual ion beam deposition of diamond films on optical elements" SPIE vol. 1146 Diamond Optics II (1989) pp. 124–134.

Liou et al "Low Temperature Diamond Deposition on Glass" SPIE vol. 1146 Diamond Optics II (1989) pp. 12–20.

World Patents Index Latest, Section Ch, Week 8611, Derwent Publications Ltd., London, GB; Class E, AN 86-074915 & SU-A-1 175 906 (Y.U.A. Moiseev et al.) Aug. 30, 1985.

European Search Report in counterpart European Patent Application No. EP 92 10 2541, dated May 14, 1992.

*Primary Examiner*—Archene Turner
*Attorney, Agent, or Firm*—Finnegan, Henderson, Farabow, Garrett and Dunner

[57] ABSTRACT

Carbon film coated glass is disclosed which includes a glass substrate, an intermediate layer formed on a surface of the glass substrate in a thickness of 50 angstroms or more and including metallic oxide in an amount of 5% or more by mole and balance of carbon at least, and a carbon film formed on a surface of the intermediate layer in a thickness of 10 angstroms or more. The intermediate layer closely binds the glass substrate and the carbon film together, and thereby it inhibits the carbon film from coming off. The carbon film coated glass is thus improved in the durability. Additionally, the carbon film can include fluorine which is combined with its surface at least, and thereby it improves the repellency of the carbon film coated glass as well as the transparency thereof.

27 Claims, 14 Drawing Sheets

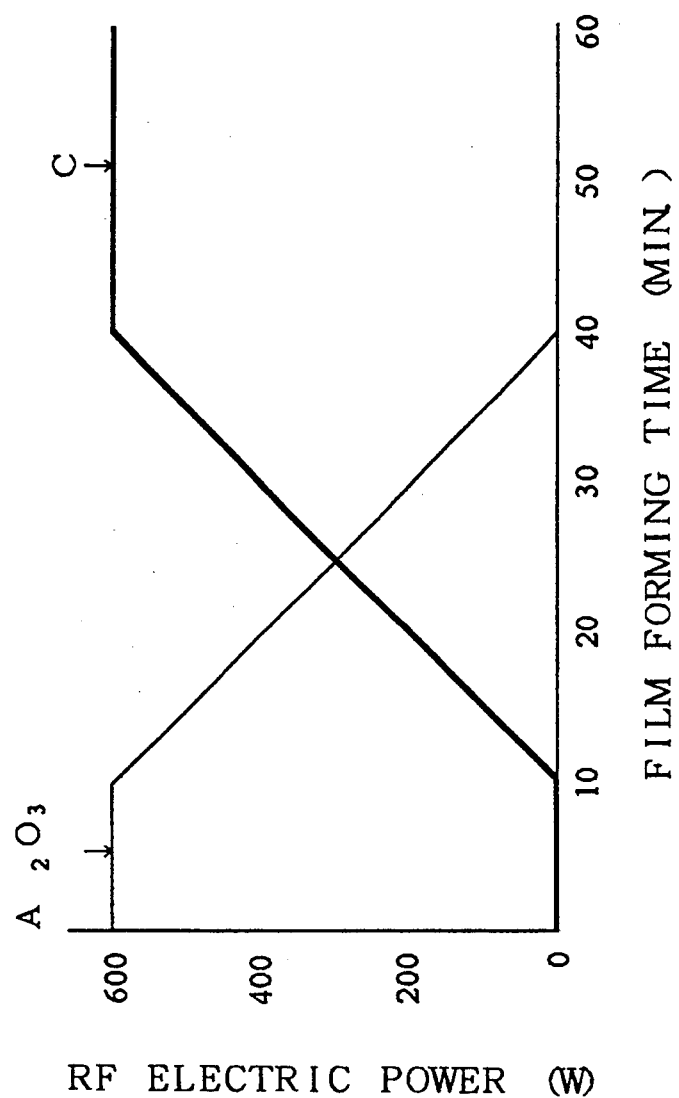

CARBON FILM COATED GLASS

BACKGROUND OF THE INVENTION

1. Field of the Invention

The present invention relates to carbon film coated glass which is applicable, for instance, to repellent glass, a reactor, such as a reactor pipe and so on, or the like.

2. Description of the Related Art

As disclosed in Japanese Unexamined Patent Publication (Kokai) No. 188,447/1990, carbon film coated glass, which is utilized, for example, as a reactor pipe, has been known. This conventional carbon film coated glass comprises quartz glass and a carbon film which is formed on a surface of the quarts glass. The carbon film coated glass is produced by supplying a carried gas which includes a raw material adapted for forming a carbon film onto the surface of the quartz glass. The quartz glass has been reduced with a hydrogen gas in advance.

The conventional carbon film coated glass, however, has drawbacks in that the adhesion between the carbon film and the quartz glass is insufficient, and in that the carbon film is likely to come off accordingly. Hence, the conventional carbon film coated glass has been lacking durability. In addition, the conventional carbon film coated glass sometimes suffers from insufficient repellency in certain applications.

A first aspect of the present invention has been developed in view of the drawbacks of the conventional carbon film coated glass. It is an object of the first aspect of the present invention to provide carbon film coated glass whose carbon film is less likely to come off.

Further, a second aspect of the present invention has been developed also in view of the drawbacks of the conventional carbon film coated glass. It is an object of the second aspect of the present invention to provide carbon film coated glass whose repellency is held to a sufficient extent and at the same time whose carbon film is less likely to come off.

The first aspect of carbon film coated glass according to the present invention comprises:
- a glass substrate;
- an intermediate layer formed on a surface of the glass substrate in a thickness of 50 angstroms or more and including metallic oxide in an amount of 5% or more by mole and balance of carbon at least; and
- a carbon film formed on a surface of the intermediate layer in a thickness of 10 angstroms or more.

Further, the second aspect of carbon film coated glass according to the present invention comprises:
- a glass substrate;
- an intermediate layer formed on a surface of the glass substrate in a thickness of 50 angstroms or more and including metallic oxide in an amount of 5% or more by mole and balance of carbon at least; and
- a fluorine-including carbon film formed on a surface of the intermediate layer in a thickness of 10 angstroms or more and combined with fluorine in a surface thereof at least.

As the glass substrate, it is possible to employ a glass substrate which includes oxide glass such as silicate glass, borosilicate glass, soda-lime glass, flint glass, or the like. This glass substrate can be in a variety of shapes such as a plate-like shape, a pipe-like shape, and so on.

As the metallic oxide of the intermediate layer, it is possible to employ one or more of the following metallic oxides: $SiO_2$, $TiO_2$, $ZrO_2$, $Y_2O_3$, $Al_2O_3$, PbO, CaO, MgO, $B_2O_3$, $Fe_2O_3$, $Na_2O$, $K_2O$, $Li_2O$, and so on. This intermediate layer includes the metallic oxide in an amount of 5% or more by mole. When the intermediate layer includes the metallic oxide in an amount of less than 5% by mole, the adhesion between the glass substrate and the intermediate layer, and the adhesion between the intermediate layer and the carbon film or the fluorine-including carbon film are insufficient. Here, the amount can be derived from the mole fraction which expresses a composition of a material mixture. Namely, the mole fraction is the ratio of the number of moles of a component in a material mixture to the total number moles of all the components in the material mixture, and accordingly the sum of the moles fractions of all the components in the material mixture is 1 (i.e., 100% by mole). This mole fraction can be calculated as follows. For instance, let the present intermediate layer which includes the carbon and the metallic oxide be a material mixture. When the atomic percentage (or atomic %) of either one the carbon and the metallic oxide is known, the mole fraction of the other component can be derived therefrom. Further, let the present fluorine-including carbon film be a material mixture. When the atomic % of either one the carbon and the fluorine is known, the mole fraction of the other component can be derived therefrom.

As the intermediate layer, it is possible to employ an intermediate layer which includes the metallic oxide and balance of carbon. Further, it is preferred to employ an intermediate layer which includes the metallic oxide, fluorine and balance of carbon, since such a construction further gives repellency which results from the fluorine even after the carbon film or the fluorine-including carbon film is worn out. Furthermore, in order to further improve the adhesion between the intermediate layer and the carbon film or the fluorine-including carbon film, it is preferred to employ an intermediate layer in which the atomic % of the carbon increases with respect to that of the metallic oxide as the intermediate layer approaches the outermost surface.

This intermediate layer is formed on a surface of the glass substrate in a thickness of 50 angstroms or more. When the thickness of the intermediate layer is less than 50 angstroms, the adhesion between the glass substrate and the intermediate layer, and the adhesion between the intermediate layer and the carbon film or the fluorine-including carbon film is insufficient, and accordingly such a thickness adversely affects the repellency, for instance.

This intermediate layer can be formed by physical vacuum deposition (hereinafter abbreviated to PVD), chemical vacuum deposition (hereinafter abbreviated to CVD), or the like. In particular, it is preferred to form the intermediate layer by PVD in view of the adhesion improvement.

In the first aspect of the carbon film coated glass according to the present invention, the carbon film includes carbon at least. In the second aspect of the carbon film coated glass according to the present invention, the fluorine-including carbon film includes a carbon film which is combined with fluorine in its surface at least. The carbon film and the fluorine-including carbon film are formed on a surface of the intermediate layer in a thickness of 10 angstroms or more. When the thickness of the carbon film and the fluorine-including carbon film is less than 10 angstroms, the carbon included in the carbon film and the fluorine-including carbon film is less likely to effect its functions such as the wear resistance or the like.

The carbon film and the fluorine-including carbon film can be formed by PVD, CVD, or the like. In particular, it is preferred to form the carbon film and the fluorine-including carbon film by PVD in view of the adhesion improvement. The fluorine-including carbon film can be formed by PVD in which a gas containing fluorine, such as a $CF_4$ gas or the like, is employed. In this way, a surface fluorination treatment can be carried out during PVD. In the case that PVD is employed, the intermediate layer and the carbon film or the fluorine-including carbon film can be formed continuously by adapting the metallic oxide and the carbon to be targets or evaporation sources and by varying sputtering electric power or the like as time elapses. When the intermediate layer and the carbon film or the fluorine-including carbon film are formed continuously by radio frequency (hereinafter abbreviated to RF) sputtering, RF electric power is varied. Further, when the intermediate layer and the carbon film or the fluorine-including carbon film are formed continuously by PVD, electron beam (hereinafter abbreviated to EB) current or resistance heating current is varied. Furthermore, when the intermediate layer and the carbon film or the fluorine-including carbon film are formed continuously by direct current (hereinafter abbreviated to DC) sputtering, DC current is varied.

In the carbon film coated glass according to the present invention, micro-fine convexes and concaves which result from the carbon particles deposited on the surface shed water or the like which is present or the surface, and thereby the water or the like is made into droplets because of the surface tension. Thus, the present carbon film coated glass repels the water or the like. Accordingly, the present carbon film coated glass can be adapted to be repellent glass which is applicable to automobile windshield glass or the like. If such an application is desired, the carbon film coated glass is adapted to be transparent repel lent glass by employing the following construction. Namely, if such is the case, a transparent glass substrate is employed, the kind of the metallic oxide to be employed is selected, the mole percentages of the metallic oxide and the carbon in the intermediate layer and the carbon film or the fluorine-including carbon film are adjusted, and the thicknesses of the intermediate layer and the carbon film or the fluorine-including carbon film are adjusted so that the present carbon film coated glass exhibits a predetermined transparency. Moreover, the present carbon film coated glass can be adapted to be a reactor pipe or the like into which a gas or the like is introduced and the gas or the like is reacted with carbon or the like.

In the first aspect of the carbon film coated glass according to the present invention, since there is provided the intermediate layer between the glass substrate and the carbon film and since the intermediate layer adheres closely to the glass substrate and the carbon film, the intermediate layer works as a binder layer which binds the glass substrate and the carbon film together. Therefore, it is believed that the intermediate layer inhibits the carbon film from coming off.

Further, in the second aspect of the carbon film coated glass according to the present invention, since the fluorine-including carbon film is employed which is combined with fluorine in its surface at least, the repellency can be improved. Likewise, in the second aspect of the carbon film coated glass, since there is provided the intermediate layer between the glass substrate and the fluorine-including carbon film and since the intermediate layer adheres closely to the glass substrate and the fluorine-including carbon film, not only the intermediate layer keeps the improved water repellency, but also it inhibits the fluorine-including carbon film from coming off, as described above.

In particular, when the intermediate layer is formed by PVD or CVD, the metal atoms and the carbon atoms are activated during the vapor deposition process so that metal-carbon (M-C) bonds are more likely to form between the metal atoms and the carbon atoms. As a result, a firmer intermediate layer can be formed.

As having been described so far, in the first and second aspects of the carbon film coated glass according to the present invention, since there is provided the intermediate layer between the glass substrate and the carbon film or the fluorine-including carbon film, the carbon film or the fluorine-including carbon film is less likely to come off.

Especially, in the second aspect of the carbon film coated glass according to the present invention, the fluorine-including carbon film is employed which is combined with fluorine in its surface at least, the carbon film coated glass can be improved in the repellency.

Since the present carbon film coated glass has an excellent durability as described above, repellent glass, a reactor pipe, or the like, to which the present carbon film coated glass is applied, can be used for a long period of time.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 22 is a graph which illustrates a relationship between time and RF electric powers applied to targets when producing the Tenth Preferred Embodiment of the carbon film coated glass according to the present invention;

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

Figure 1:
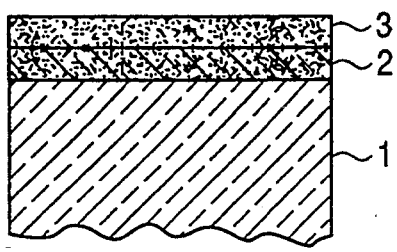
FIG. 1 is a schematic cross sectional view of First through Seventh Preferred Embodiments of carbon film coated glass according to the present invention.

As illustrated in FIG. 1, the First through Eighth Preferred Embodiments of the carbon film coated glass according to the present invention comprise a glass substrate 1, an intermediate layer 2 formed on a surface of the glass substrate 1, and a carbon film 3 formed on a surface of the intermediate layer 2.

First Preferred Embodiment

Figure 2:
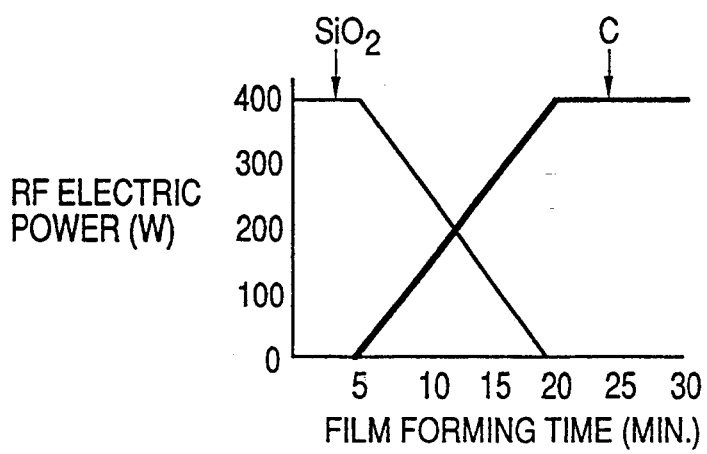
FIG. 2 is a graph which illustrates a relationship between time and RF electric powers applied to targets when producing the First Preferred Embodiment of the carbon film coated glass according to the present invention.

The First Preferred Embodiment of the carbon film coated glass according to the present invention was produced as described below. First, two targets, namely a C (carbon) target and an $SiO_2$ target, were provided in a vacuum chamber of a bipolar RF magnetron sputtering apparatus. The glass substrate 1 was also provided in the vacuum chamber of the sputtering apparatus. The vacuum chamber was evacuated to $2 \times 10^{-3}$ Pa or less, and the glass substrate 1 was heated to 300° C. Then, an Ar (argon) gas was introduced into the vacuum chamber until a pressure therein became $1 \times 10^{-1}$ Pa, and RF electric powers (in watt) applied to the C target and the $SiO_2$ target were varied as time elapsed as illustrated in FIG. 2, thereby carrying out film forming by sputtering. Thus, the carbon film coated glass was obtained which had the intermediate layer 2 formed on the glass substrate 1 and the carbon film 3 formed on the intermediate layer 2.

Figure 3:
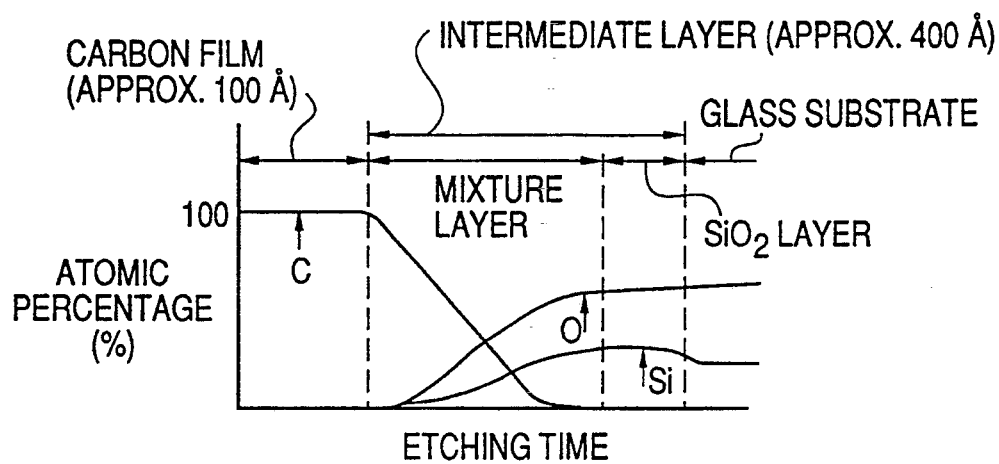
FIG. 3 is a graphic representation of results of the Auger electron spectroscopy (hereinafter abbreviated to AES) carried out onto the First Preferred Embodiment of the carbon film coated glass, and shows a relationship between etching time and atomic percentages.
Figure 24:
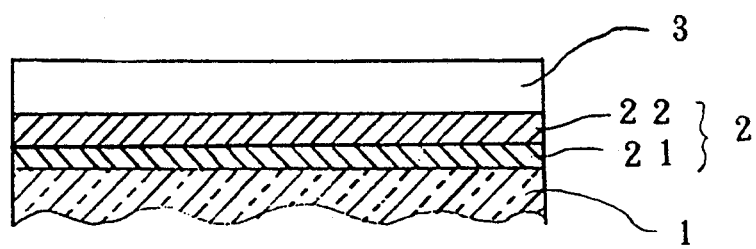
FIG. 24 is an enlarged schematic cross sectional view of the First through Third Preferred Embodiments of the carbon film coated glass according to the present invention.

This carbon film coated glass was analyzed quantitatively with an AES apparatus for its C, Si and O atomic percentages from its outermost surface in a depthwise direction, and results of this quantitative analysis are shown in FIG. 3. FIG. 3 illustrates the relationship between etching time (in minute) required for etching the C, Si and O from the surface of the carbon film coated glass and atomic percentages (in atomic %) of the elements. As can be seen from FIG. 3, it is understood that the intermediate layer 2 was formed on the glass substrate 1 in a thickness of approximately 400 angstroms, and that the carbon film 3 was formed on this intermediate layer 2 in a thickness of approximately 100 angstroms. In addition, as illustrated in FIG. 24, the intermediate layer 2 was formed so that it included an $SiO_2$ layer 21 which included $SiO_2$ only was formed on the glass substrate I in a thickness of approximately 100 angstroms, and a mixture layer 22 which included $SiO_2$ and C and in which the mole percentage of the C became higher as the outermost surface approached was formed on the $SiO_2$ layer 21 in a thickness of approximately 300 angstroms.

Onto this carbon film coated glass, a water droplet was dropped in order to evaluate a contact angle between the carbon film coated glass and the water droplet. The contact angle was found to be approximately 90°. Thus, it is apparent that this carbon film coated glass is applicable to water repellent glass.

Further, this carbon film coated glass was worn with a dry flannel cloth under frictional conditions of a load of 300 gf and 3,000 times of a "to and fro" movement. No change was appreciable on the carbon film 3. Hence, it is understood that this carbon film coated glass was superior in the adhesion of the carbon film 3 and in the durability.

Second Preferred Embodiment

The Second Preferred Embodiment of the carbon film coated glass according to the present invention was produced in a manner similar to that of the First Preferred Embodiment, however, the RF electric powers are varied as time elapsed in a manner different from that of the First Preferred Embodiment. The other production arrangements were the same as those of the First Preferred Embodiment.

Figure 4:
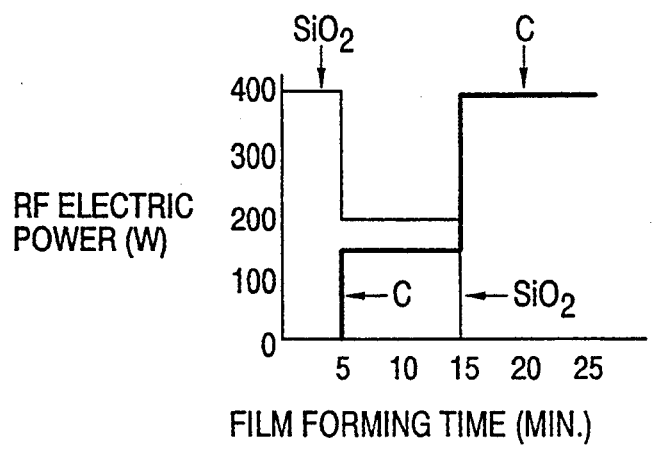
FIG. 4 is a graph which illustrates a relationship between time and RF electric powers applied to targets when producing the Second Preferred Embodiment of the carbon film coated glass according to the present invention.
Figure 5:
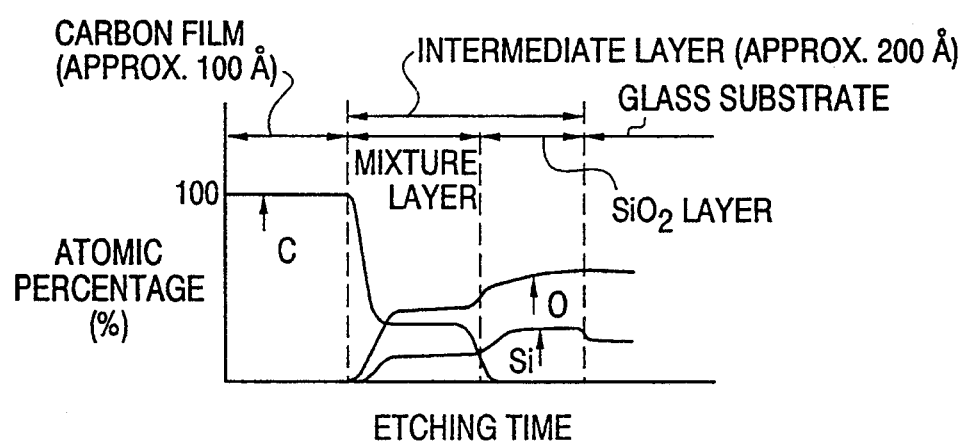
FIG. 5 is a graphic representation of results of the AES carried out onto the Second Preferred Embodiment of the carbon film coated glass, and shows a relationship between etching time and atomic percentages.

Namely, the RF electric powers (in watt) applied to the C target and the $SiO_2$ target were varied as time elapsed as illustrated in FIG. 4, thereby carrying out film forming by sputtering. The thus obtained carbon film coated glass was analyzed quantitatively with the AES apparatus for its C, Si and O atomic percentages from its outermost surface in a depthwise direction. As can be seen from FIG. 5, the intermediate layer 2 was formed on the glass substrate 1 in a thickness of approximately 200 angstroms, and the carbon film 3 was formed on this intermediate layer 2 in a thickness of approximately 100 angstroms. In addition, as illustrated in FIG. 24, the intermediate layer 2 was formed so that it included an $SiO_2$ layer 21 which included $SiO_2$ only was formed on the glass substrate 1 in a thickness of approximately 100 angstroms, and a mixture layer 22 which included $SiO_2$ and C was formed on the $SiO_2$ layer 21 in a thickness of approximately 100 angstroms.

Also in this carbon film coated glass, the contact angle was found to be approximately 90°. Likewise, this carbon film coated glass was worn under the same frictional conditions as those described in the First Preferred Embodiment. No change was appreciable also on the carbon film 3.

Comparative Example

Figure 6:
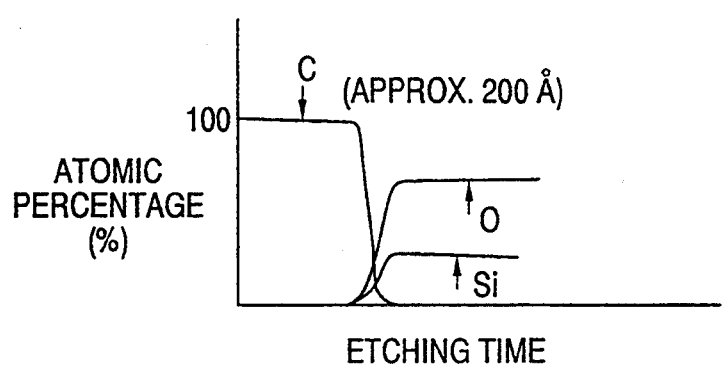
FIG. 6 is a graphic representation of results of the AES carried out onto Comparative Example of carbon film coated glass, and shows a relationship between etching time and atomic percentages.

In comparison, a comparative carbon film coated glass was prepared by using a C target only and by carrying out film forming by sputtering at a constant RF electric power of 400 watts. The other production arrangements were the same as those of the First Preferred Embodiment. The thus obtained comparative carbon film coated glass was analyzed quantitatively with the AES apparatus for its C, Si and O atomic percentages from its outermost surface in a depthwise direction. As can be seen from FIG. 6, a carbon film was formed substantially directly on a glass substrate in a thickness of approximately 200 angstroms.

In this comparative carbon film coated glass, the contact angle was found to be approximately 90°, and its water repellency was favorable. However, in this comparative carbon film coated glass, the entire carbon film was come off when the "to and fro" movement was carried out only 50 times, and the contact angle deteriorated to 50°.

Third Preferred Embodiment

Figure 7:
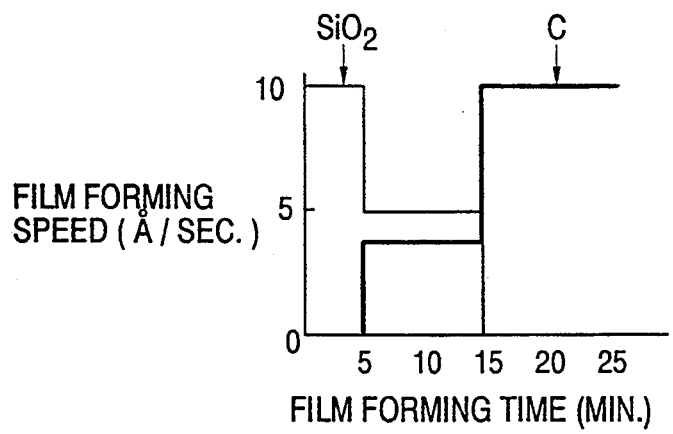
FIG. 7 is a graph which illustrates a relationship between time and RF electric powers applied to targets when producing the Third Preferred Embodiment of the carbon film coated glass according to the present invention.

The Third Preferred Embodiment of the carbon film coated glass according to the present invention was produced with an ion plating apparatus which had two evaporation sources, i.e., a C evaporation source and an $SiO_2$ evaporation source, as described below. First, the C evaporation source and the $SiO_2$ evaporation source were provided in a vacuum chamber of the ion plating apparatus. The glass substrate 1 was also provided in the vacuum chamber of the ion plating apparatus. The vacuum chamber was evacuated to $2 \times 10^{-3}$ Pa or less, and the glass substrate 1 was heated to 300°C. Then, an Ar gas was introduced into the vacuum chamber until a pressure therein became $2 \times 10^{-2}$ Pa, and an acceleration voltage of $-5$ kV was applied to the C evaporation source and the $SiO_2$ electron beam evaporation source. At the same time, $-50$ kV was applied to a DC bias voltage application electrode which was placed above the glass substrate 1. Further, an emission current was varied as time elapsed in order to vary the film forming speeds (in angstroms/second) of C and $SiO_2$ as illustrated in FIG. 7. As a result, plasma discharges were generated, and accordingly film forming was carried out by ion plating. The Third Preferred Embodiment of the carbon film coated glass was thus obtained.

Also in this carbon film coated glass, the contact angle was found to be approximately 90°. Likewise, this carbon film coated glass was worn under the same frictional conditions as those described in the First Preferred Embodiment. No change was appreciable also on the carbon film 3.

Test Specimens Evaluation

A variety of carbon film coated glass test specimens were prepared by varying the RF electric powers (in watt) applied to the C target and $SiO_2$ target as time elapsed in a manner similar to the Second Preferred Embodiment, however, the film forming was interrupted at various times or prolonged to various times in order to vary the thickness of their intermediate layers 2. The other production arrangements were the same as those of the Second Preferred Embodiment.

Figure 8:
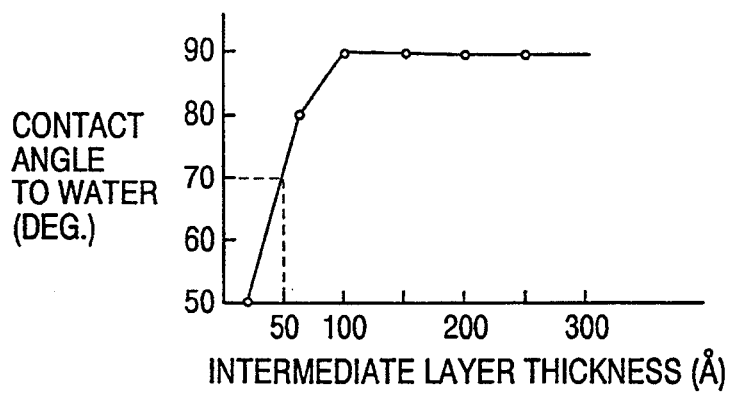
FIG. 8 is a graphic representation of results of a test specimens evaluation, and shows a relationship between intermediate layer thickness and contact angle.

These carbon film coated glass test specimens were worn under the same frictional conditions as those described in the First Preferred Embodiment, and thereafter their contact angles (in degree) were evaluated. The results of this evaluation are shown in FIG. 8. As can be seen from FIG. 8, it is understood that the carbon film coated glass exhibited the contact angle which exceeded approximately 70° with respect to water, and that it was superior in the durability when the intermediate layer had a thickness of 50 angstroms or more.

Figure 9:
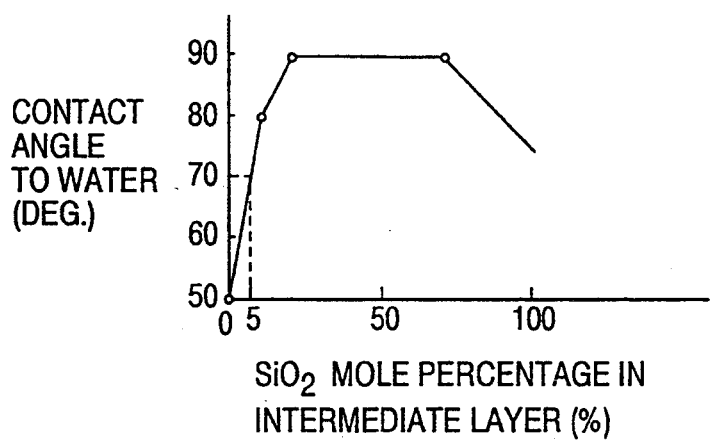
FIG. 9 is a graphic representation of another results of the test specimens evaluation, and shows a relationship between $SiO_2$ mole percentage in intermediate layer and contact angle after a wear test.

Further, a variety of carbon film coated glass test specimens were prepared by varying the RF electric powers (in watt) applied to the C target and SiO₂ target as time elapsed in a manner similar to the Second Preferred Embodiment, however, the film forming was interrupted at various times or prolonged to various times in order to vary the mole percentage of the SiO₂ (in %) in their intermediate layers 2. The other production arrangements were the same as those of the Second Preferred Embodiment. These carbon film coated glass test specimens were worn under the same frictional conditions as those described in the First Preferred Embodiment, and thereafter their contact angles (in degree) were evaluated. The results of this evaluation are shown in FIG. 9. As can be seen from FIG. 9, it is understood that the carbon film coated glass exhibited the contact angle which exceeded approximately 70° with respect to water, and that it was superior in the durability when the intermediate layer 2 had the SiO₂ mole percentage of 5% or more. In addition, it was found that the carbon film coated glass was superior in the durability even when the intermediate layer included the SiO₂ only.

Fourth Preferred Embodiment

The Fourth Preferred Embodiment of the carbon film coated glass according to the present invention was produced in a manner similar to that of the First Preferred Embodiment, however, a C target and a TiO₂ target were provided in the vacuum chamber of the sputtering apparatus and the RF electric powers applied to the targets were varied as time elapsed in a manner different from that of the First Preferred Embodiment. The other production arrangements were the same as those of the First Preferred Embodiment.

Figure 10:
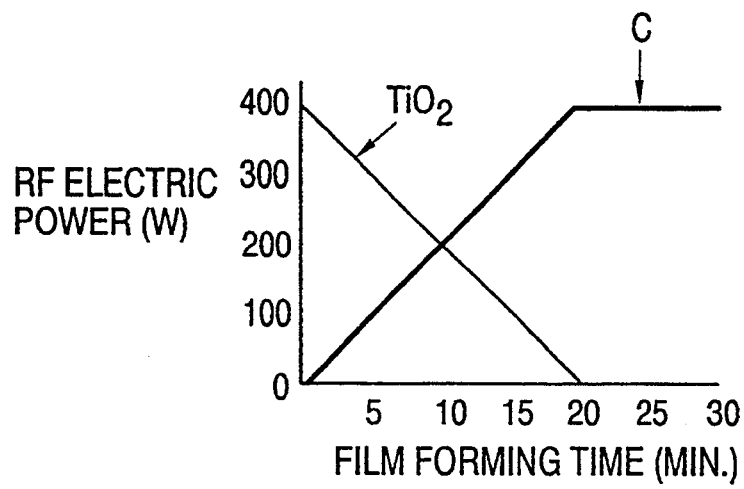
FIG. 10 is a graph which illustrates a relationship between time and RF electric powers applied to targets when producing the Fourth Preferred Embodiment of the carbon film coated glass according to the present invention.
Figure 11:
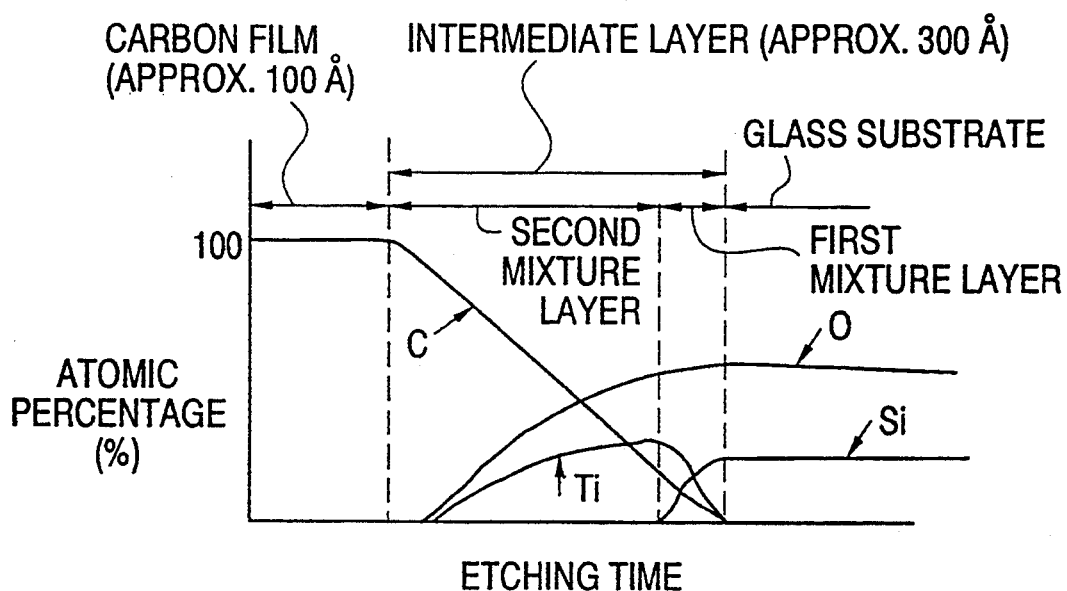
FIG. 11 is a graphic representation of results of the AES carried out onto the Fourth Preferred Embodiment of the carbon film coated glass, and shows a relationship between etching time and atomic percentages.
Figure 25:
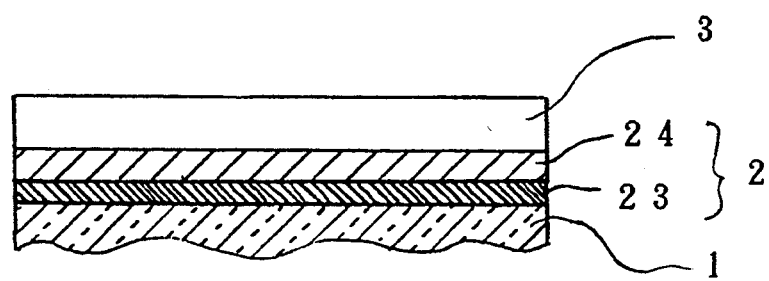
FIG. 25 is an enlarged schematic cross sectional view of the Fourth through Seventh Preferred Embodiments of the carbon film coated glass according to the present invention.

Namely, the RF electric powers (in watt) applied to the C target and the TiO₂ target were varied as time elapsed as illustrated in FIG. 10, thereby carrying out film forming by sputtering. The thus obtained carbon film coated glass was analyzed quantitatively with the AES apparatus for its C, Ti, Si and O atomic percentages from its outermost surface in a depthwise direction. As can be seen from FIG. 11, the intermediate layer 2 was formed on the glass substrate 1 in a thickness of approximately 300 angstroms, and the carbon film 3 was formed on this intermediate layer 2 in a thickness of approximately 100 angstroms. In addition, as illustrated in FIG. 25, the intermediate layer 2 was formed so that it included a first mixture layer 23 which included SiO₂, TiO₂ and C was formed on the glass substrate 1 in a thickness of approximately 60 angstroms, and a second mixture layer 24 which included TiO₂ and C was formed on the first mixture layer 23 in a thickness of approximately 240 angstroms. In the first and second mixture layers 23 and 24, the mole percentages of the C became higher as outermost surfaces of the first and second mixture layers 23 and 24 approached. It is believed that the SiO₂ included in the first mixture layer 23 because the SiO₂ contained in the glass substrate 1 migrated from the glass substrate 1 to the intermediate layer 2 during the film forming by sputtering.

In this carbon film coated glass, the TiO₂ was likely to exhibit an affinity for the SiO₂ in the glass substrate 1. The contact angle of this carbon film coated glass was found to be maintained at approximately 90° even after it was worn under the same frictional conditions as those described in the First Preferred Embodiment. No change was appreciable on the carbon film 3.

Fifth Preferred Embodiment

The Fifth Preferred Embodiment of the carbon film coated glass according to the present invention was produced in a manner similar to that of the First Preferred Embodiment, however, a C target and a ZrO₂ target were provided in the vacuum chamber of the sputtering apparatus and the RF electric powers applied to the targets were varied as time elapsed in a manner different from that of the First Preferred Embodiment. The other production arrangements were the same as those of the First Preferred Embodiment.

Figure 12:
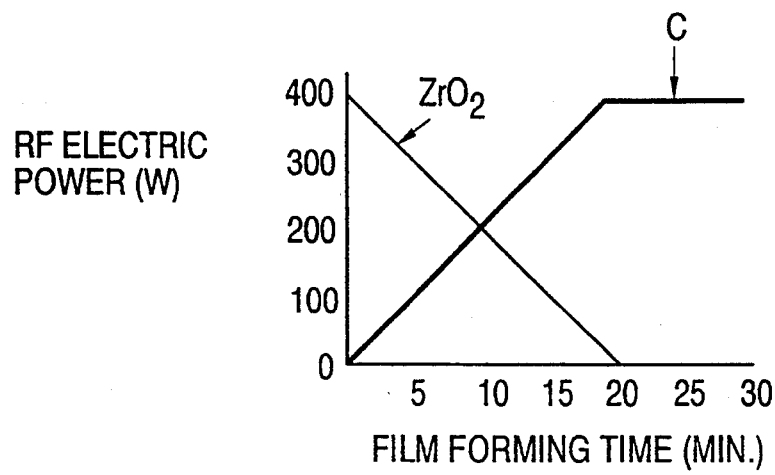
FIG. 12 is a graph which illustrates a relationship between time and RF electric powers applied to targets when producing the Fifth Preferred Embodiment of the carbon film coated glass according to the present invention.
Figure 13:
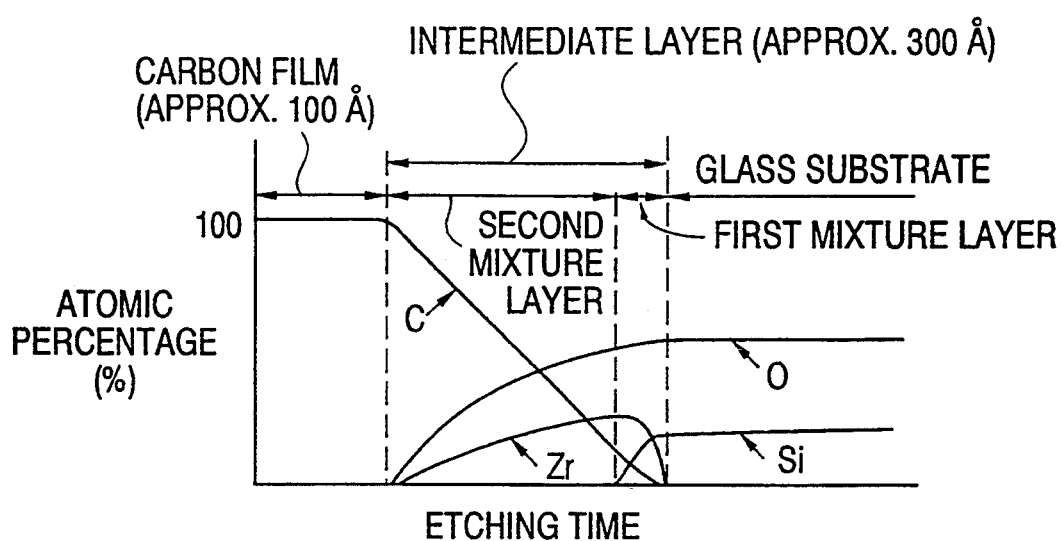
FIG. 13 is a graphic representation of results of the AES carried out onto the Fifth Preferred Embodiment of the carbon film coated glass, and shows a relationship between etching time and atomic percentages.

Namely, the RF electric powers (in watt) applied to the C target and the ZrO₂ target were varied as time elapsed as illustrated in FIG. 12, thereby carrying out film forming by sputtering. The thus obtained carbon film coated glass was analyzed quantitatively with the AES apparatus for its C, Zr, Si and O atomic percentages from its outermost surface in a depthwise direction. As can be seen from FIG. 13, the intermediate layer 2 was formed on the glass substrate 1 in a thickness of approximately 300 angstroms, and the carbon film 3 was formed on this intermediate layer 2 in a thickness of approximately 100 angstroms. In addition, as illustrated in FIG. 25, the intermediate layer 2 was formed so that it included a first mixture layer 23 which included SiO₂, ZrO₂ and C was formed on the glass substrate 1 in a thickness of approximately 60 angstroms, and a second mixture layer 24 which included ZrO₂ and C was formed on the first mixture layer 23 in a thickness of approximately 240 angstroms. In the first and second mixture layers 23 and 24, the mole percentages of the C became higher as outermost surfaces of the first and second mixture layers 23 and 24 approached.

Also in this carbon film coated glass, the ZrO₂ was likely to exhibit an affinity for the SiO₂ in the glass substrate 1. The contact angle of this carbon film coated glass was found to be maintained at approximately 90° even after it was worn under the same frictional conditions as those described in the First Preferred Embodiment. No change was appreciable on the carbon film 3.

Sixth Preferred Embodiment

The Sixth Preferred Embodiment of the carbon film coated glass according to the present invention was produced in a manner similar to that of the First Preferred Embodiment, however, a C target and a Y₂O₃ target were provided in the vacuum chamber of the sputtering apparatus and the RF electric powers applied to the targets were varied as time elapsed in a manner different from that of the First Preferred Embodiment. The other production arrangements were the same as those of the First Preferred Embodiment.

Figure 14:
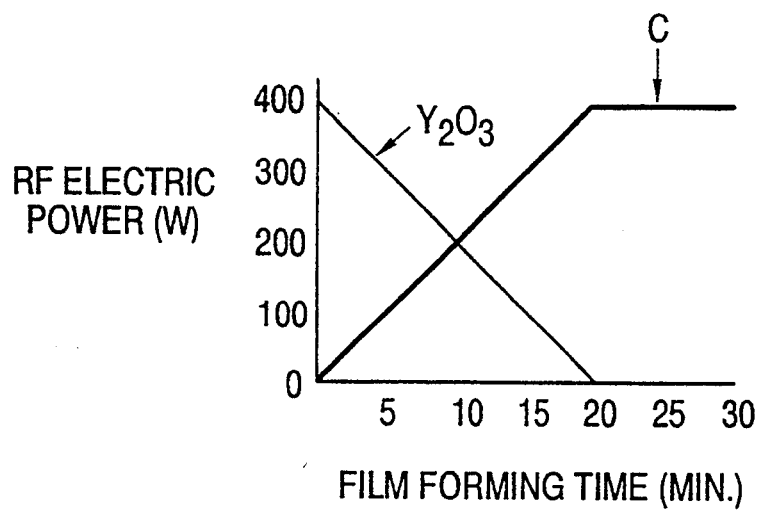
FIG. 14 is a graph which illustrates a relationship between time and RF electric powers applied to targets when producing the Sixth Preferred Embodiment of the carbon film coated glass according to the present invention.
Figure 15:
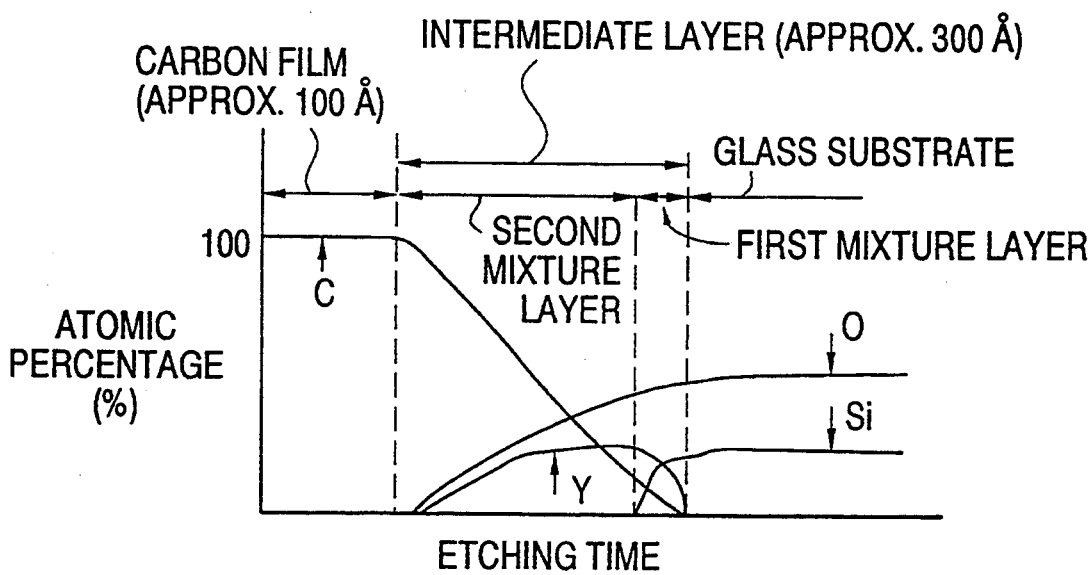
FIG. 15 is a graphic representation of results of the AES carried out onto the Sixth Preferred Embodiment of the carbon film coated glass, and shows a relationship between etching time and atomic percentages.

Namely, the RF electric powers (in watt) applied to the C target and the Y₂O₃ target were varied as time elapsed as illustrated in FIG. 14, thereby carrying out film forming by sputtering. The thus obtained carbon film coated glass was analyzed quantitatively with the AES apparatus for its C, Y, Si and O atomic percentages from its outermost surface in a depthwise direction. As can be seen from FIG. 15, the intermediate layer 2 was formed on the glass substrate 1 in a thickness of approximately 300 angstroms, and the carbon film 3 was formed on this intermediate layer 2 in a thickness of approximately 100 angstroms. In addition, as illustrated in FIG. 25, the intermediate layer 2 was formed so that it included a first mixture layer 23 which included SiO₂, Y₂O₃ and C was formed on the glass substrate 1 in a thickness of approximately 60 angstroms, and a second mixture layer 24 which included $Y_2O_3$ and C was formed on the first mixture layer 23 in a thickness of approximately 240 angstroms. In the first and second mixture layers 23 and 24, the mole percentages of the C became higher as outermost surfaces of the first and second mixture layers 23 and 24 approached.

Also in this carbon film coated glass, the $Y_2O_3$ was likely to exhibit an affinity for the $SiO_2$ in the glass substrate 1. The contact angle of this carbon film coated glass was found to be maintained at approximately 90° even after it was worn under the same frictional conditions as those described in the First Preferred Embodiment. No change was appreciable on the carbon film 3.

Seventh Preferred Embodiment

The Seventh Preferred Embodiment of the carbon film coated glass according to the present invention was produced in a manner similar to that of the First Preferred Embodiment, however, a C target and an $Al_2O_3$ target were provided in the vacuum chamber of the sputtering apparatus and the RF electric powers applied to the targets were varied as time elapsed in a manner different From that of the First Preferred Embodiment. The other production arrangements were the same as those of the First Preferred Embodiment.

Figure 16:
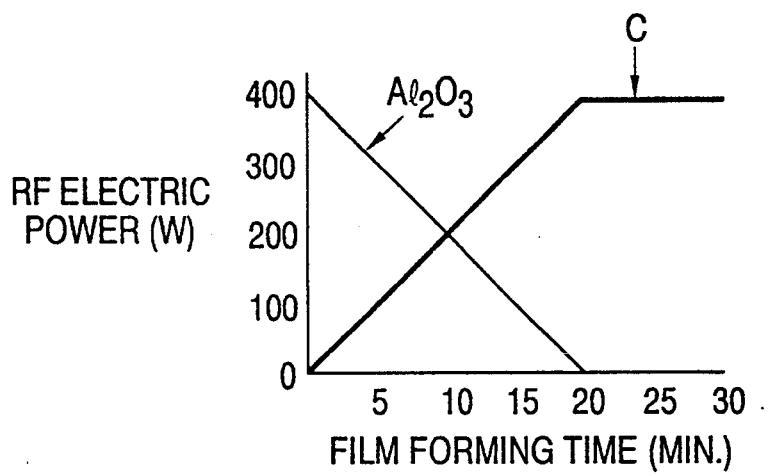
FIG. 16 is a graph which illustrates a relationship between time and RF electric powers applied to targets when producing the Seventh Preferred Embodiment of the carbon film coated glass according to the present invention.
Figure 17:
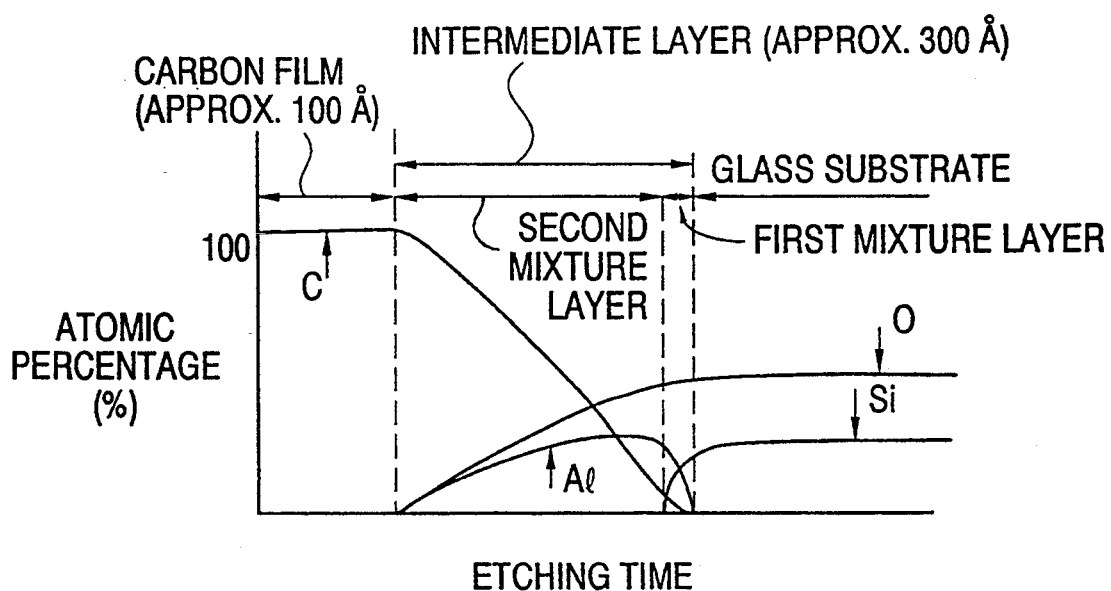
FIG. 17 is a graphic representation of results of the AES carried out onto the Seventh Preferred Embodiment of the carbon film coated glass, and shows a relationship between etching time and atomic percentages.

Namely, the RF electric powers (in watt) applied to the C target and the $Al_2O_3$ target were varied as time elapsed as illustrated in FIG. 16, thereby carrying out film forming by sputtering. The thus obtained carbon film coated glass was analyzed quantitatively with the AES apparatus for its C, Al, Si and O atomic percentages from its outermost surface in a depthwise direction. As can be seen from FIG. 17, the intermediate layer 2 was formed on the glass substrate 1 in a thickness of approximately 300 angstroms, and the carbon film 3 was formed on this intermediate layer 2 in a thickness of approximately 100 angstroms. In addition, as illustrated in FIG. 25, the intermediate late layer 2 was formed so that it included a first mixture layer 23 which included $SiO_2$, $Al_2O_3$ and C was formed on the glass substrate 1 in a thickness of approximately 30 angstroms, and a second mixture layer 24 which included $Al_2O_3$ and C was formed on the first mixture layer 23 in a thickness of approximately 270 angstroms. In the first and second mixture layers 23 and 24, the mole percentages of the C became higher as outermost surfaces of the first and second mixture layers 23 and 24 approached.

Also in this carbon film coated glass, the $Al_2O_3$ was likely to exhibit an affinity for the $SiO_2$ in the glass substrate 1. The contact angle of this carbon film coated glass was found to be maintained at approximately 90° even after it was worn under the same frictional conditions as those described in the First Preferred Embodiment. No change was appreciable on the carbon film 3.

Modified Version

In the First through Seventh Preferred Embodiments of the carbon film coated glass according to the present invention, $SiO_2$, $TiO_2$, $ZrO_2$, $Y_2O_3$, $Al_2O_3$ targets or evaporation sources were used to produce the intermediate layers 2. However, even when a $Na_2O$—$CaO$—$SiO_2$ target was used to form an intermediate layer 2, the resulting carbon film coated glass operated and effected advantages similarly to those of the First through Seventh Preferred Embodiments.

Eighth Preferred Embodiment

Figure 26:
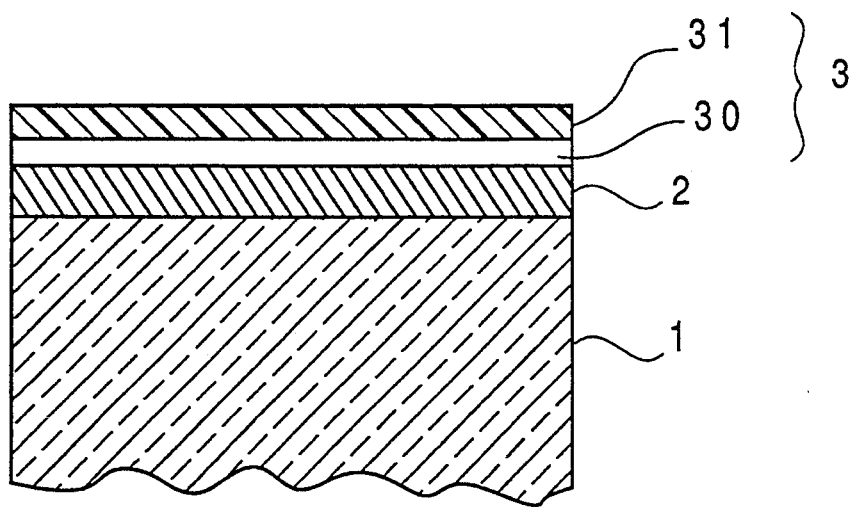
FIG. 26 is a schematic cross sectional view of the Eighth Preferred Embodiment of the carbon film coated glass according to the present invention.

The Eighth Preferred Embodiment of the carbon film coated glass according to the present invention is adapted to be glass which has a further enhanced water repellency. As illustrated in FIG. 26, this water repellent glass comprises a glass substrate 1, an intermediate layer 2 formed on the glass substrate 1, and a fluorine-including carbon film 3 in which fluorine is combined with its surface. The fluorine-including carbon film 3 includes a carbon film layer 30 formed on the intermediate layer 2, and a fluorine-including carbon film layer 31 formed on the carbon film layer 30. The other arrangements of this water repellent glass are identical with those of the First Preferred Embodiment.

Figure 18:
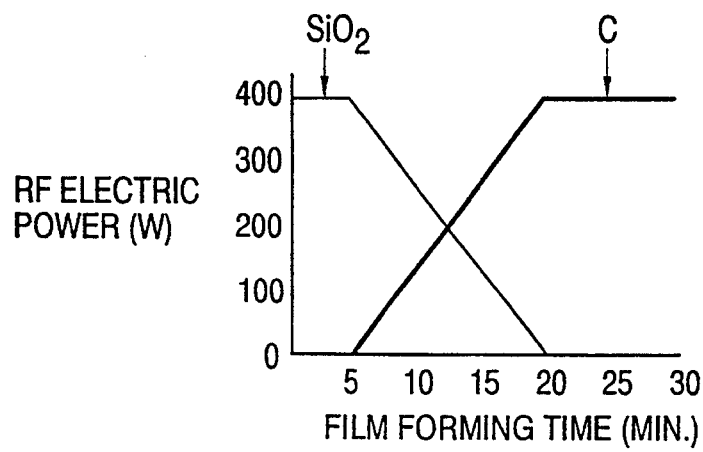
FIG. 18 is a graph which illustrates a relationship between time and RF electric powers applied to targets when producing the Eighth Preferred Embodiment of the carbon film coated glass according to the present invention.

This water repellent glass was produced as described below. First, two targets, namely a C target and an $SiO_2$ target, were provided in a vacuum chamber of a bipolar RF magnetron sputtering apparatus. The glass substrate 1 was also provided in the vacuum chamber of the sputtering apparatus. The vacuum chamber was evacuated to $2 \times 10^{-3}$ Pa or less, and the glass substrate 1 was heated to 300° C. Then, an Ar gas was introduced into the vacuum chamber until a pressure therein became $1 \times 10^{-1}$ Pa, and RF electric powers (in watt) applied to the C target and the $SiO_2$ target were varied as time elapsed as illustrated in FIG. 18, thereby carrying out film forming by sputtering. Thus, the carbon film coated glass was obtained which had the intermediate layer 2 formed on the glass substrate 1 and the carbon film layer 30 formed on the intermediate layer 2 and having a good adhesion therewith.

Thereafter, a $CF_4$ gas was mixed in the Ar gas in an amount of 10% by volume, and a flow of the mixture gas was adjusted so that a pressure in the vacuum chamber was $1 \times 10^{-1}$ Pa. Then, an RF electric power of 200 W was applied to a metallic substrate holder, thereby generating a plasma adjacent to the above-described carbon film coated glass. A surface fluorination treatment was thus carried out in 10 minutes, thereby obtaining the water repellent glass illustrated in FIG. 26.

Figure 19:
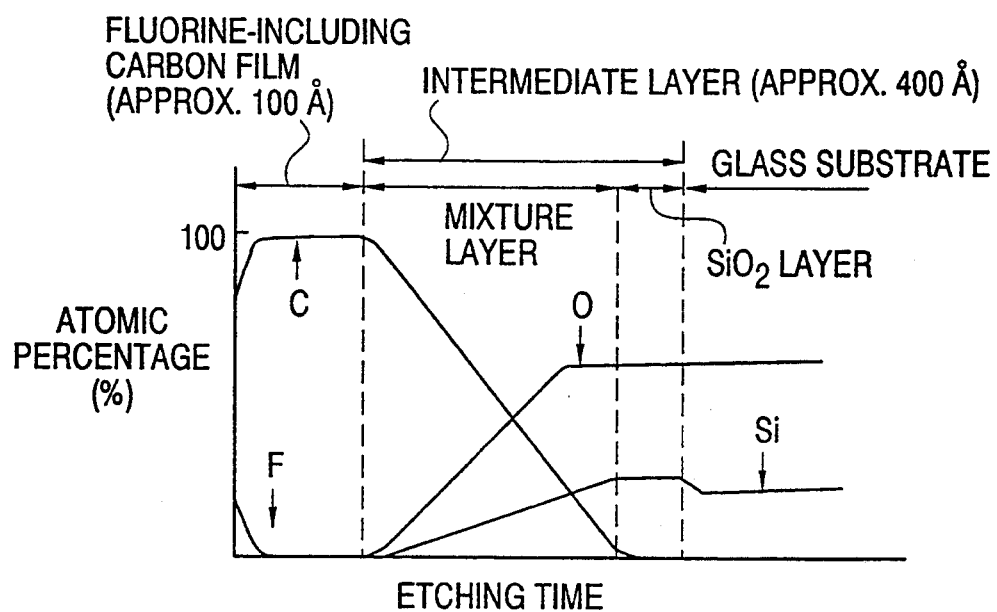
FIG. 19 is a graphic representation of results of the AES carried out onto the Eighth Preferred Embodiment of the carbon film coated glass, and shows a relationship between etching time and atomic percentages.
Figure 27:
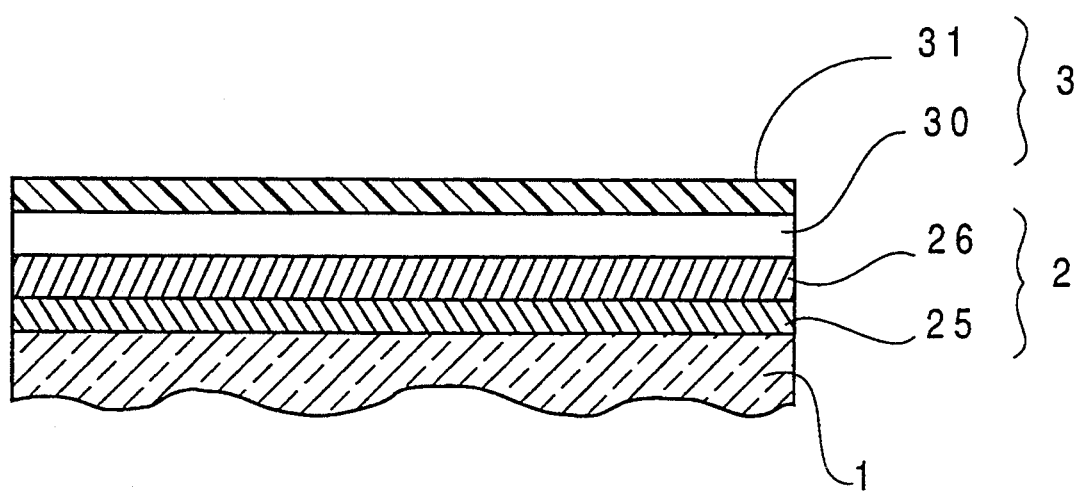
FIG. 27 is an enlarged schematic cross sectional view of the Eighth Preferred Embodiment of the carbon film coated glass.

This water repellent glass was analyzed quantitatively with the AES apparatus for its C, Si, O and F atomic percentages from its outermost surface in a depthwise direction, and results of this quantitative analysis are shown in FIG. 19. FIG. 19 illustrates the relationship between etching time (in minute) required for etching the C, Si, O and F from the surface of the water repellent glass and atomic percentages (in atomic %) of the elements. The relationship can be converted to a thickness (in angstrom) of the films and the layers. As can be seen from FIG. 19, it is understood that the intermediate layer 2 was formed on the glass substrate 1 in a thickness of approximately 400 angstroms, and that the fluorine-including carbon film 3 which included the carbon film layer 30 and the fluorine-including carbon film layer 31 was formed on this intermediate layer 2 in a thickness of approximately 100 angstroms. In addition, as illustrated in FIG. 27, the intermediate layer 2 was formed so that it included an $SiO_2$ layer 25 which included $SiO_2$ only was formed on the glass substrate 1 in a thickness of approximately 100 angstroms, and a mixture layer 26 which included $SiO_2$ and C and in which the mole percentage of the C became higher as the outermost surface approached was formed on the $SiO_2$ layer 25 in a thickness of approximately 300 angstroms. The fluorine-including carbon film layer 31 was formed by combining F with the carbon film layer 30 which included C only as described above. Accordingly, as can be seen from FIG. 19, the mole percentage of the F became higher as the outermost surface approached in the fluorine-including carbon film layer 31.

The contact angle of this water repellent glass was found to be 120° with respect to the water droplet. It is apparent that this water repellent glass exhibited a water repellency which is enhanced more than those of the First through Seventh Preferred Embodiments of the present carbon film coated glass.

Further, a weather resistance of this water repellent glass was evaluated with a sun-shine weatherometer under a predetermined moisture condition at 63° C. Even after the water repellent glass is exposed to the weathering conditions for 2,000 hours, it still exhibited a contact angle of approximately 100°. Thus, this water repellent glass was found to have an extremely favorable weather resistance. As for the carbon film coated glass which differed from this water repellent glass only an that it was not subjected to the previously described surface fluorination treatment, it exhibited a deteriorated contact angle of approximately 60°, after it was exposed to the weathering conditions for 1,000 hours.

Furthermore, a surface of this water repellent glass was worn under the same frictional conditions as those described in the First Preferred Embodiment. It was found that the adhesion of the fluorine-including carbon film 3 which included the carbon film layer 30 and the fluorine-including carbon film layer 31 formed thereon was as excellent as those of the First through Seventh Preferred Embodiments.

In addition, it is believed that this water repellent glass absorbs less light in the visible light range than the carbon film 3 of the First through Seventh Preferred Embodiments including carbon only does. This is because carbon is combined with fluorine in the fluorine-including carbon film 3 of this water repellent glass which included the carbon film layer 30 and the fluorine-including carbon film layer 31 formed thereon. Accordingly, this water repellent glass can raise the transmittance of the visible light.

Hence, this water repellent glass could provide not only the superb water repellency but also the favorable weather resistance and adhesion. Moreover, it could provide a satisfactory transparency as well.

Ninth Preferred Embodiment

Figure 28:
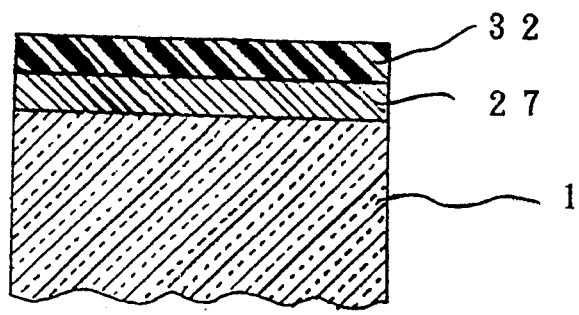
FIG. 28 is a schematic cross sectional view of the Ninth and Tenth Preferred Embodiments of the carbon film coated glass according to the present invention.

The Ninth Preferred Embodiment of the carbon film coated glass according to the present invention is also adapted to be glass which has a further enhanced water repellency. As illustrated in FIG. 28, this water repellent glass includes a fluorine-including intermediate layer 27 which includes $SiO_2$, F and balance of C, and a fluorine-including carbon film 32. The other arrangements of this water repellent glass are identical with those of the Eighth Preferred Embodiment.

Figure 20:
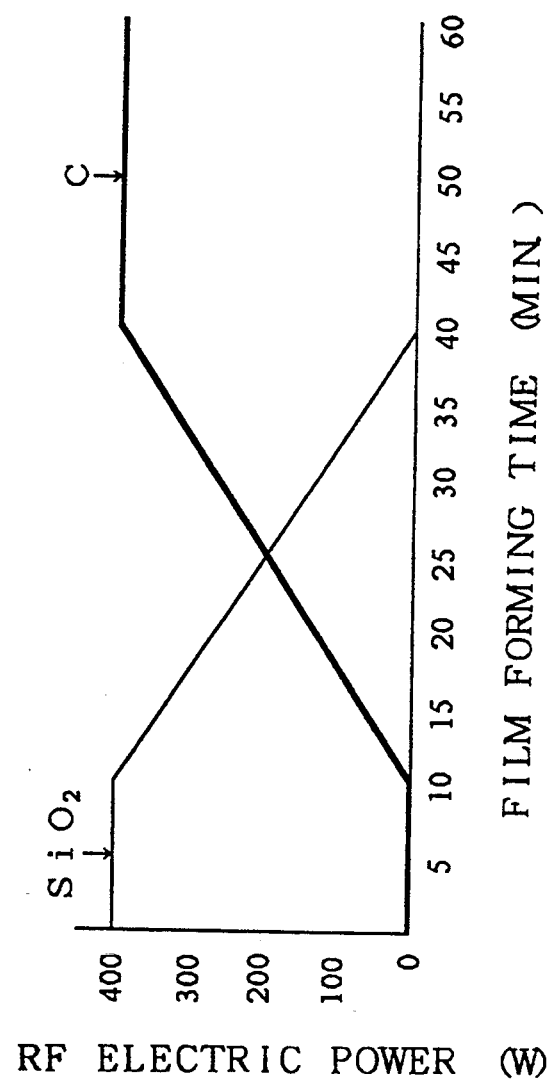
FIG. 20 is a graph which illustrates a relationship between time and RF electric powers applied to targets when producing the Ninth Preferred Embodiment of the carbon film coated glass according to the present invention.

This water repellent glass was produced as described below. First, in a manner similar to the Eighth Preferred Embodiment, two targets, namely a C target and an $SiO_2$ target, were provided in the vacuum chamber of the bipolar RF magnetron sputtering apparatus. The glass substrate 1 was also provided in the vacuum chamber of the sputtering apparatus. The vacuum chamber was evacuated to $2 \times 10^{-3}$ Pa or less, and the glass substrate 1 was heated to 300° C. Then, a mixture gas which included a $CF_4$ gas in an amount of 20% by volume and balance of an Ar gas was introduced into the vacuum chamber until a pressure therein became $1 \times 10^{-1}$ Pa, and RF electric powers (in watt) applied to the C target and the $SiO_2$ target were varied as time elapsed as illustrated in FIG. 20, thereby carrying out film forming by sputtering. Thus, as illustrated in FIG. 28, the water repellent glass was obtained which included the fluorine-including intermediate layer 27 formed on the glass substrate 1 and the fluorine-including carbon film 32 formed on the fluorine-including intermediate layer 27 and having a good adhesion therewith.

Figure 21:
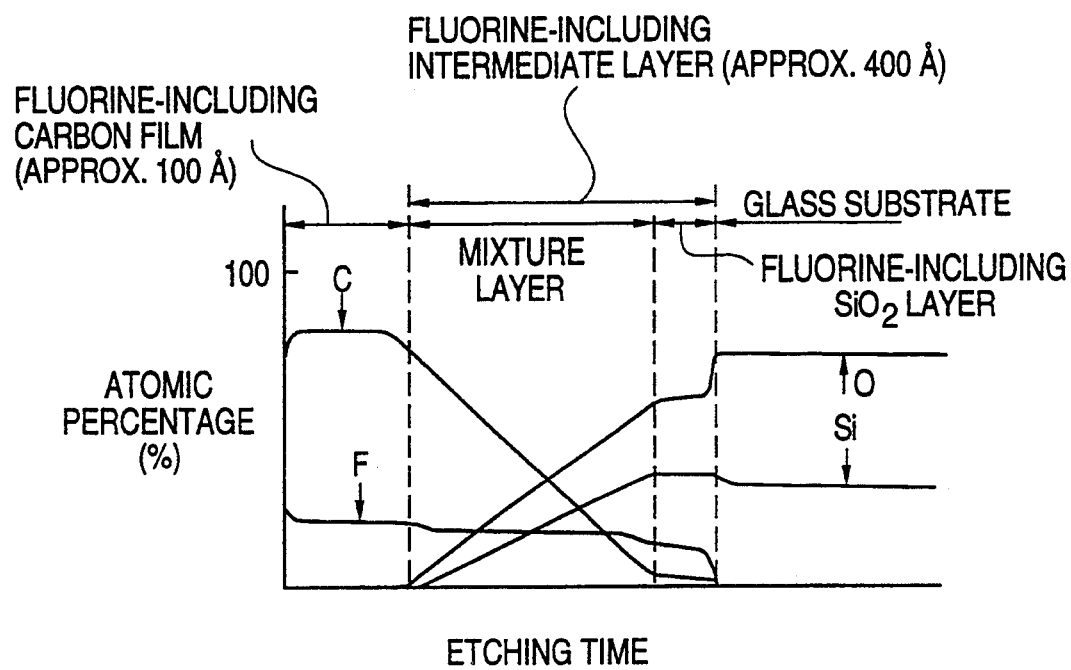
FIG. 21 is a graphic representation of results of the AES carried out onto the Ninth Preferred Embodiment of the carbon film coated glass, and shows a relationship between etching time and atomic percentages.
Figure 23:
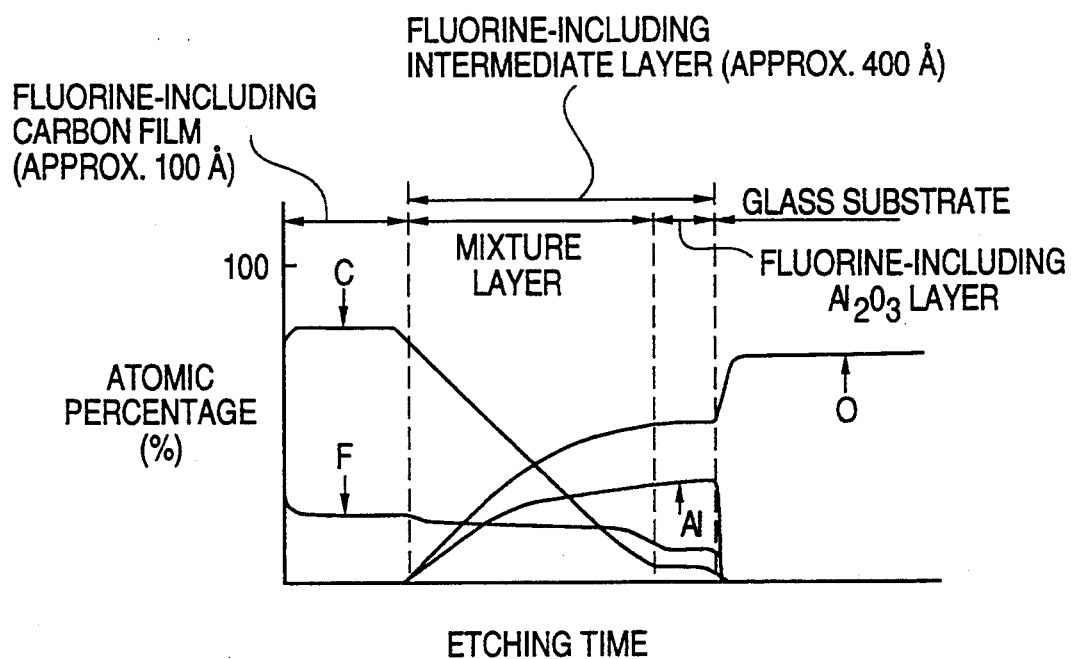
FIG. 23 is a graphic representation of results of the AES carried out onto the Tenth Preferred Embodiment of the carbon film coated glass, and shows a relationship between etching time and atomic percentages.
Figure 29:
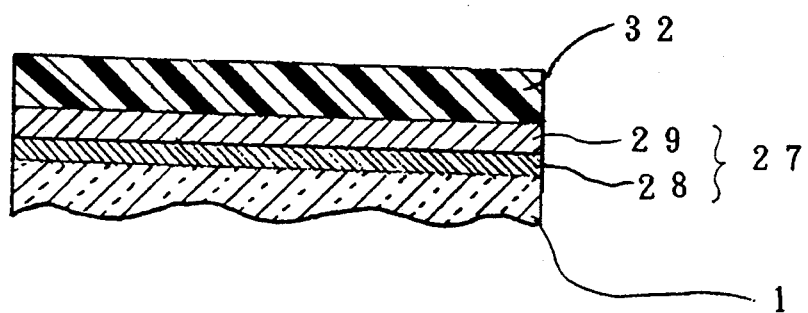
FIG. 29 is an enlarged schematic cross sectional view of the Ninth and Tenth Embodiments of the carbon film coated glass.

This water repellent glass was analyzed quantitatively with the AES apparatus for its C, Si, O and F atomic percentages from its outermost surface in a depthwise direction, and results of this quantitative analysis are shown in FIG. 21. As can be seen from FIG. 21, it is understood that the fluorine-including intermediate layer 27 was formed on the glass substrate 1 in a thickness of approximately 400 angstroms, and that the fluorine-including carbon film 32 was formed on this fluorine-including intermediate layer 27 in a thickness of approximately 100 angstroms. In addition, as illustrated in FIG. 29, the fluorine-including intermediate layer 27 was formed so that it included a fluorine-including $SiO_2$ layer 28 which included $SiO_2$ and F was formed on the glass substrate 1 in a thickness of approximately 100 angstroms, and a mixture layer 29 which included $SiO_2$, F and C and in which the mole percentage of the C became higher as the outermost surface approached was formed on the fluorine-including $SiO_2$ layer 28 in a thickness of approximately 300 angstroms. The fluorine-including carbon film 32 included C and F, and it had a higher mole percentage of F adjacent to the outermost surface thereof.

The contact angle of this water repellent glass was also found to be 120° with respect to the water droplet. It is apparent that this water repellent glass also exhibited an excellent water repellency.

Further, a weather resistance of this water repellent glass was evaluated in a manner similar to that of the Eighth Preferred Embodiment. Even after the water repellent glass is exposed to the weathering conditions for 2,000 hours, it still exhibited a contact angle of approximately 100°. Thus, it was found to have an extremely favorable weather resistance.

Furthermore, in this water repellent glass, the adhesion of the fluorine-including carbon film 32 was as excellent as that of the Eighth Preferred Embodiment.

In addition, since this water repellent glass had the fluorine-including intermediate layer 21, it maintained to have a water repellency which resulted from the fluorine-including intermediate layer 27 even after the outermost fluorine-including carbon film 32 was caused not to be present by an excessive wear.

Moreover, C is combined with F in the fluorine-including carbon film 32 and the fluorine-including intermediate layer 27. Accordingly, this water repellent glass can further raise the transmittance of the visible light when compared with that of the Eighth Preferred Embodiment.

Hence, this water repellent glass could provide not only the advantageous effects similar to those of the Eighth Preferred Embodiment, but also it could keep the sufficient weather resistance for a long period time and provide a further satisfactory transparency as well.

Tenth Preferred Embodiment

The Tenth Preferred Embodiment of the carbon film coated glass according to the present invention is also adapted to be glass which has a further enhanced water repellency. This water repellent glass was produced in a manner similar to that of the Ninth Preferred Embodiment, however, a C target and an Al$_2$O$_3$ target were provided in the vacuum chamber of the sputtering apparatus and the RF electric powers applied to the targets were varied as time elapsed in a manner different from that of the Ninth Preferred Embodiment. The other production arrangements were the same as those of the Ninth Preferred Embodiment.

This water repellent glass was produced as described below. First, in a manner similar to the Ninth Preferred Embodiment, two targets, namely a C target and an Al$_2$O$_3$ target, were provided in the vacuum chamber of the bipolar RF magnetron sputtering apparatus. The glass substrate 1 was also provided in the vacuum chamber of the sputtering apparatus. The vacuum chamber was evacuated to $2\times10^{-3}$ Pa or less, and the glass substrate 1 was heated to 300 °C. Then, a mixture gas which included a CF$_4$ gas in an amount of 20% by volume and balance of an Ar gas was introduced into the vacuum chamber until a pressure therein became $1\times10^{-1}$ Pa, and RF electric powers (in watt) applied to the C target and the Al$_2$O$_3$ target were varied as time elapsed as illustrated in FIG. 22, thereby carrying out film forming by sputtering. Thus, as illustrated in FIG. 28, the water repellent glass was obtained which included the fluorine-including intermediate layer 27 formed on the glass substrate 1 and the fluorine-including carbon film 32 formed on the fluorine-including intermediate layer 27 and having a good adhesion therewith.

This water repellent glass was analyzed quantitatively with the AES apparatus for its C, Al, O and F atomic percentages from its outermost surface in a depthwise direction, and results of this quantitative analysis are shown in FIG. 24. As can be seen from FIG. 24, it is understood that the fluorine-including intermediate layer 27 was formed on the glass substrate 1 in a thickness of approximately 400 angstroms, and that the fluorine-including carbon film 32 was formed on this fluorine-including intermediate layer 27 in a thickness of approximately 100 angstroms. In addition, as illustrated in FIG. 29, the fluorine-including intermediate layer 27 was formed so that it included a fluorine-including Al$_2$O$_3$ layer 28 which included Al$_2$O$_3$ and F was formed on the glass substrate 1 in a thickness of approximately 100 angstroms, and a mixture Layer 29 which included Al$_2$O$_3$, F and C and in which the mole percentage of the C became higher as the outermost surface approached was formed on the fluorine-including Al$_2$O$_3$ layer 28 in a thickness of approximately 300 angstroms. The fluorine-including carbon film 32 included C and F, and it had a higher mole percentage of F adjacent to the outermost surface thereof.

This water repellent glass operated and effected advantages similarly to that of the Ninth Preferred Embodiment. Hence, the operation and the advantageous effects of this water repellent glass will not be described herein.

Having now fully described the present invention, it will be apparent to one of ordinary skill in the art that many changes and modifications can be made thereto without departing from the spirit or scope of the present invention as set forth herein including the appended claims.

What is claimed is:

1. Carbon film coated glass, comprising:

a glass substrate;

an intermediate layer formed on a surface of said glass substrate by physical vacuum deposition, said intermediate layer having a thickness of 50 angstroms or more and comprising carbon and 5 mole % or more of one or more metallic oxides, wherein said deposition is carried out by a process comprising applying to a carbon target a first electric power input which increases to a predetermined value over a period of time and applying to a metallic oxide target a second electric power input which decreases to a predetermined value over a period of time, the intermediate layer being formed predominantly of said one or more metallic oxides adjacent said glass substrate and having a metallic oxides content which decreases as the distance away from said glass substrate increases; and a carbon film formed by physical vacuum deposition on said intermediate layer and having a thickness of 10 angstroms or more.

2. The carbon film coated glass according to claim 1, wherein said intermediate layer has an innermost surface and an outermost surface and the mole percentage of said carbon in said intermediate layer increases from said innermost surface thereof toward said outermost surface thereof.

3. The carbon film coated glass according to claim 1, wherein said intermediate layer includes a metallic oxide layer comprised of one or more metallic oxides formed on the substrate and a mixture layer formed on the metallic oxide layer and comprised of carbon and one or more metallic oxides.

4. The carbon film coated glass according to claim 3, wherein said mixture layer has an innermost surface and an outermost surface and the mole percentage of said carbon in said mixture layer increases from said innermost surface thereof toward said outermost surface thereof.

5. The carbon film coated glass according to claim 1, wherein said intermediate layer includes a first mixture layer comprised of a plurality of metallic oxides and carbon, and a second mixture layer formed on the first mixture layer and comprised of one of said metallic oxides and carbon.

6. The carbon film coated glass according to claim 5, wherein each of said mixture layers has an innermost surface and an outermost surface and the mole percentages of said carbon in said first and second mixture layers both increase from said innermost surfaces thereof toward said outermost surfaces thereof.

7. The carbon film coated glass according to claim 1, wherein said carbon film further includes fluorine which is combined therewith at least at a surface thereof.

8. The carbon film coated glass according to claim 7, wherein said carbon film has an innermost surface and an outermost surface and the mole percentage of said fluorine increases in said carbon film from said innermost surface thereof toward said outermost surface thereof.

9. The carbon film coated glass according to claim 1, wherein said carbon film further includes fluorine which is combined therewith across its thickness.

10. The carbon film coated glass according to claim 9, wherein said carbon film has an innermost surface and an outermost surface and the mole percentage of said fluorine increases in said carbon film from said innermost surface thereof toward said outermost surface thereof.

11. The carbon film coated glass according to claim 1, wherein said intermediate layer further includes fluorine.

12. The carbon film coated glass according to claim 1, wherein said glass substrate includes at least one oxide glass selected from the group consisting of silicate glass, borosilicate glass, soda-lime glass and flint glass.

13. The carbon film coated glass according to claim 1, wherein said metallic oxide includes at least one member selected from the group consisting of $SiO_2$, $TiO_2$, $ZrO_2$, $Y_2O_3$, $Al_2O_3$, PbO, CaO, MgO, $B_2O_3$, $Fe_2O_3$, $Na_2O$, $K_2O$ and $Li_2O$.

14. Carbon film coated glass, comprising:
a glass substrate;
an intermediate layer formed on a surface of said glass substrate by physical vacuum deposition, said intermediate layer having a thickness of 50 angstroms or more and comprising carbon and 5 mole % of one or more metallic oxides, wherein said deposition is carried out by a process comprising applying to a carbon target a first electric power input which increases to a predetermined value over a period of time and applying to a metallic oxide target a second electric power input which decreases to a predetermined value over a period of time, the intermediate layer being formed predominantly of said one or more metallic oxides adjacent said glass substrate and having a metallic oxides content which decreases as the distance away from said glass substrate increases; and
a fluorine-containing carbon film formed by physical vacuum deposition on said intermediate layer and having a thickness of 10 angstroms or more and combined with fluorine at least at a surface thereof.

15. The carbon film coated glass according to claim 14, wherein said intermediate layer has an innermost surface and an outermost surface and the mole percentage of carbon in said intermediate layer increases from said innermost surface thereof toward said outermost surface thereof.

16. The carbon film coated glass according to claim 14, wherein said intermediate layer further includes fluorine.

17. The carbon film glass according to claim 14, wherein said intermediate layer includes a metallic oxide layer comprised of one or more of metallic oxides formed on the substrate, and a mixture layer formed on the metallic oxide layer and comprised of one or more metallic oxides and carbon.

18. The carbon film coated glass according to claim 17, wherein said mixture layer has an innermost surface and an outermost surface and the mole percentage of said carbon in said mixture layer increases from said innermost surface thereof toward said outermost surface thereof.

19. The carbon film coated glass according to claim 17, wherein each of said metallic oxide layer and said mixture layer further includes fluorine.

20. The carbon film coated glass according to claim 14, wherein said intermediate layer includes a first mixture layer including a plurality of metallic oxides and carbon formed on the substrate and a second mixture layer formed on the first mixture layer and including one metallic oxide and carbon.

21. The carbon film coated glass according to claim 20, wherein each of said mixture layers has an innermost surface and an outermost surface and the mole percentages of said carbon in said first and second mixture layers both increase from the innermost surfaces thereof toward the outermost surfaces thereof.

22. The carbon film coated glass according to claim 20, wherein each of said first mixture layer and said second mixture layer further includes flourine.

23. The carbon film coated glass according to claim 14, wherein said fluorine-containing carbon film has an innermost surface and an outermost surface and the mole percentage of fluorine in said fluorine-containing carbon film increases from said innermost surface thereof toward said outermost surface thereof.

24. The carbon film coated glass according to claim 14, wherein said fluorine-containing carbon film is combined with fluorine, across its thickness.

25. The carbon film coated glass according to claim 24, wherein said flourine-containing carbon film has an innermost surface and an outermost surface and the mole percentage of fluorine in said fluorine-containing carbon film increases from said innermost surface thereof toward said outermost surface thereof.

26. The carbon film coated glass according to claim 14, wherein said glass substrate includes at least one oxide glass selected from the group consisting of silicate glass, borosilicate glass, soda-lime glass and flint glass.

27. The carbon film coated glass according to claim 14, wherein said metallic oxide includes at least one member selected from the group consisting of $SiO_2$, $TiO_2$, $ZrO_2$, $Y_2O_3$, $Al_2O_3$, PbO, CaO, MgO, $B_2O_3$, $Fe_2O_3$, $Na_2O$, $K_2O$ and $Li_2O$.

* * * * *